(12) United States Patent
Rustamov et al.

(10) Patent No.: US 11,190,843 B2
(45) Date of Patent: Nov. 30, 2021

(54) CONTENT RECOMMENDATION TECHNIQUES WITH REDUCED HABIT BIAS EFFECTS

(71) Applicant: AT&T Intellectual Property I, L.P., Atlanta, GA (US)

(72) Inventors: Raif Rustamov, Bridgewater, NJ (US); Ann Eileen Skudlark, San Ramon, CA (US); Christopher Volinsky, Morristown, NJ (US); Appavu Siva Prakasam, New Providence, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 16/863,139

(22) Filed: Apr. 30, 2020

(65) Prior Publication Data
US 2021/0345001 A1  Nov. 4, 2021

(51) Int. Cl.
| | | |
|---|---|---|
| *H04H 60/32* | (2008.01) | |
| *H04N 21/466* | (2011.01) | |
| *G06Q 30/02* | (2012.01) | |
| *G06Q 30/06* | (2012.01) | |
| *G06Q 20/12* | (2012.01) | |
| *H04N 21/414* | (2011.01) | |
| *G06N 20/00* | (2019.01) | |
| *H04N 21/442* | (2011.01) | |
| *H04N 21/45* | (2011.01) | |
| *G06N 5/04* | (2006.01) | |

(52) U.S. Cl.
CPC ......... *H04N 21/4666* (2013.01); *G06N 5/04* (2013.01); *G06N 20/00* (2019.01); *G06Q 20/123* (2013.01); *G06Q 30/0201* (2013.01); *G06Q 30/0631* (2013.01); *H04N 21/41407* (2013.01); *H04N 21/44204* (2013.01); *H04N 21/4532* (2013.01)

(58) Field of Classification Search
CPC ......... H04N 21/4666; H04N 21/41407; H04N 21/44204; H04N 21/4532; G06Q 30/0201; G06Q 30/0631; G06Q 20/123; G06N 5/04; G06N 20/00
See application file for complete search history.

(56) References Cited

U.S. PATENT DOCUMENTS

| | | | |
|---|---|---|---|
| 2014/0279756 A1* | 9/2014 | Whitman | G06F 16/735 706/12 |
| 2016/0274744 A1* | 9/2016 | Neumann | H04N 21/47202 |

(Continued)

*Primary Examiner* — Mulugeta Mengesha
(74) *Attorney, Agent, or Firm* — Guntin & Gust, PLC; Robert Gingher

(57) ABSTRACT

Aspects of the subject disclosure may include, for example, identifying content consumption data associated with media content consumption at a customer device, and generating a content selection recommendation for the customer device. Some embodiments can include determining a habit-based content selection vector for the customer device. Various embodiments can include determining the habit-based content selection vector based on a habit profile for the customer device. Some embodiments can include adjusting a content selection vector for the customer device based on the habit-based content selection vector for the customer device. Various embodiments can include generating the content selection recommendation for the customer device based on the adjusted content selection vector. Other embodiments are disclosed.

20 Claims, 8 Drawing Sheets

(56) References Cited

U.S. PATENT DOCUMENTS

2018/0040056 A1* 2/2018 Mahmoud ................ G06N 5/02
2018/0234796 A1* 8/2018 Saha ..................... H04W 4/023
2018/0336645 A1* 11/2018 Price ..................... G06Q 50/01

* cited by examiner

300

| | pid 1 | pid 2 | pid 3 | pid 4 | pid 5 | ... | pid P |
|---|---|---|---|---|---|---|---|
| uid 1 | 0 | 1 | 1 | 0 | 0 | ... | 1 |
| uid 2 | 1 | 0 | 1 | 1 | 1 | ... | 0 |
| uid 3 | 1 | 1 | 1 | 1 | 1 | ... | 0 |
| uid 4 | 1 | 0 | 0 | 0 | 0 | ... | 1 |
| uid 5 | 0 | 1 | 1 | 1 | 1 | ... | 0 |
| uid 6 | 1 | 1 | 1 | 1 | 1 | ... | 0 |
| uid 7 | 1 | 0 | 1 | 0 | 0 | ... | 1 |
| uid 8 | 0 | 1 | 0 | 1 | 0 | ... | 1 |
| uid 9 | 1 | 0 | 0 | 1 | 0 | ... | 1 |
| uid 10 | 0 | 0 | 0 | 0 | 0 | ... | 1 |
| uid 11 | 0 | 1 | 0 | 0 | 0 | ... | 1 |
| uid 12 | 1 | 1 | 1 | 0 | 0 | ... | 0 |
| uid 13 | 1 | 1 | 0 | 0 | 0 | ... | 1 |
| uid 14 | 1 | 0 | 0 | 0 | 0 | ... | 1 |
| ... | ... | ... | ... | ... | ... | ... | ... |
| uid N | 0 | 0 | 1 | 1 | 1 | ... | 0 |

FIG. 3

CONTENT RECOMMENDATION TECHNIQUES WITH REDUCED HABIT BIAS EFFECTS

FIELD OF THE DISCLOSURE

The subject disclosure relates to content recommendation techniques with reduced habit bias effects.

BACKGROUND

Recommender algorithms and platforms are important tools for content providers to keep customers in the buying cycle, and reduce churn by providing suggestions to viewers which may include content they expect to see, and content they may not have considered. Such algorithms and platforms can, in effect, extend the range of consumable content that is placed within the customer field of awareness. In broad terms, a typical recommender algorithm may suggest programs of potential interest based on aspects of past viewing behavior.

BRIEF DESCRIPTION OF THE DRAWINGS

Reference will now be made to the accompanying drawings, which are not necessarily drawn to scale, and wherein:

FIG. 3 depicts an illustrative embodiment of a content selection matrix in accordance with various aspects described herein.

DETAILED DESCRIPTION

Figure 1:
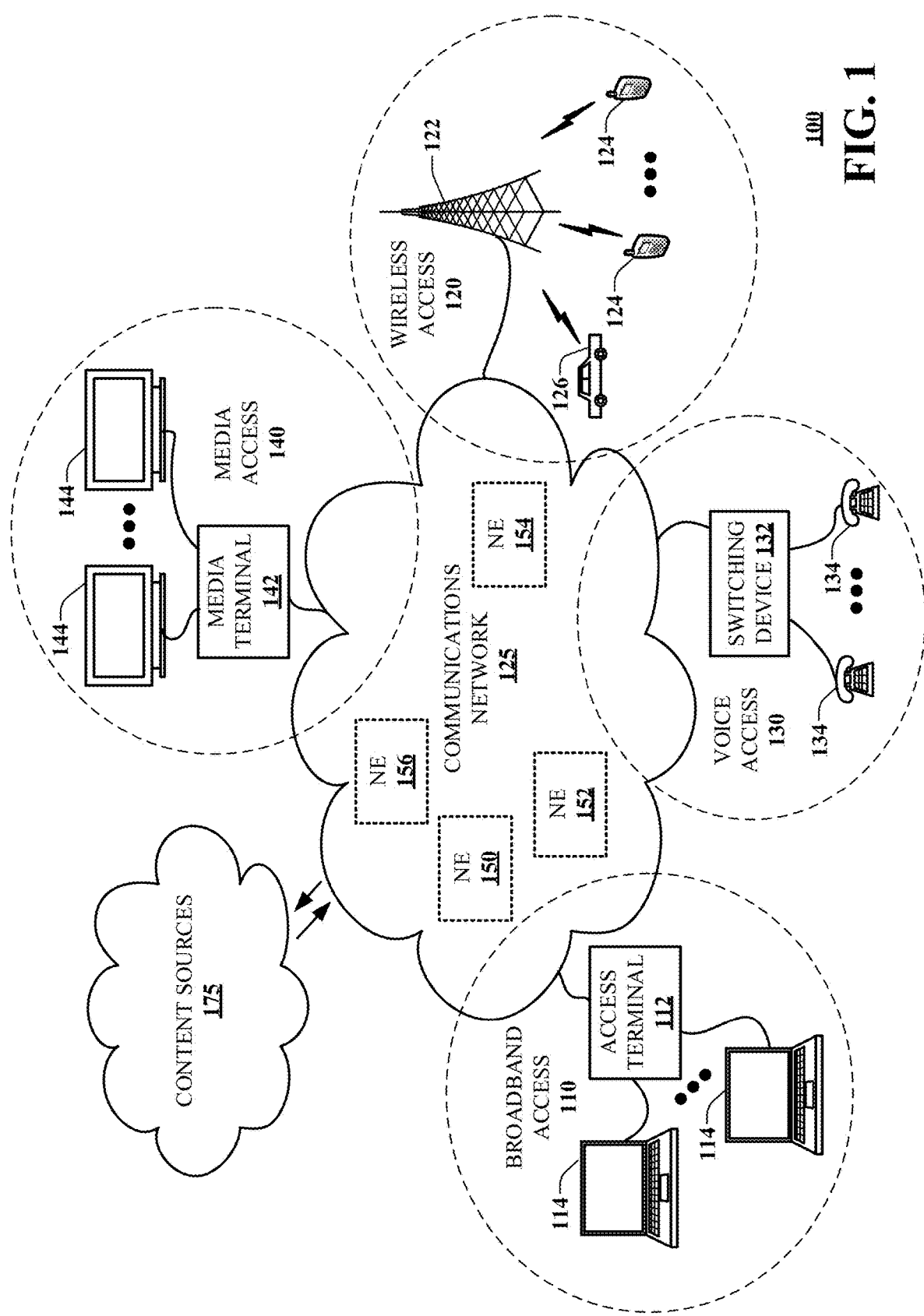
FIG. 1 is a block diagram illustrating an exemplary, non-limiting embodiment of a communications network in accordance with various aspects described herein.

The subject disclosure describes, among other things, illustrative embodiments for identifying content to be recommended for consumption at a customer device. According to techniques disclosed herein, the effects of habit bias upon a process for identifying such content can be reduced or eliminated, such that the recommended content is more likely to align with actual preferences of the customer. Some embodiments can include determining a habit-based content selection vector for a customer device. Various such embodiments can include determining the habit-based content selection vector based on a habit profile for the customer device. Some embodiments can include adjusting a content selection vector for a customer device based on a habit-based content selection vector for the customer device. Various embodiments can include generating a content selection recommendation for a customer device based on an adjusted content selection vector for the customer device. Other embodiments are described in the subject disclosure.

One or more aspects of the subject disclosure include an apparatus comprising a processing system including a processor and a memory that stores executable instructions that, when executed by the processing system, facilitate performance of operations. The operations can comprise identifying content consumption data associated with media content consumption at a customer device, and generating a content selection recommendation for the customer device. The operations can further comprise determining a habit-based content selection vector for the customer device based on a habit profile for the customer device, adjusting a content selection vector for the customer device based on the habit-based content selection vector, and generating the content selection recommendation for the customer device based on the adjusted content selection vector.

One or more aspects of the subject disclosure include a non-transitory machine-readable medium, comprising executable instructions that, when executed by a processing system including a processor, facilitate performance of operations. The operations can comprise identifying content consumption data associated with media content consumption at a customer device, and generating a content selection recommendation for the customer device. The operations can further comprise determining a habit-based content selection vector for the customer device based on a habit profile for the customer device, adjusting a content selection vector for the customer device based on the habit-based content selection vector, and generating the content selection recommendation for the customer device based on the adjusted content selection vector.

One or more aspects of the subject disclosure include a method. The method can include identifying content consumption data associated with media content consumption at a customer device, and generating a content selection recommendation for the customer device. The method can further include determining a habit-based content selection vector for the customer device based on a habit profile for the customer device, adjusting a content selection vector for the customer device based on the habit-based content selection vector, and generating the content selection recommendation for the customer device based on the adjusted content selection vector.

Referring now to FIG. 1, a block diagram is shown illustrating an example, non-limiting embodiment of a system 100 in accordance with various aspects described herein. For example, system 100 can facilitate, in whole or in part, identifying content consumption data associated with media content consumption at a customer device, constructing a content selection vector and habit profile for the customer device based on the content consumption data, determining a habit-based content selection vector for the customer device, adjusting the content selection vector based on the habit-based content selection vector, and generating a content selection recommendation for the customer device based on the adjusted content selection vector. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2:
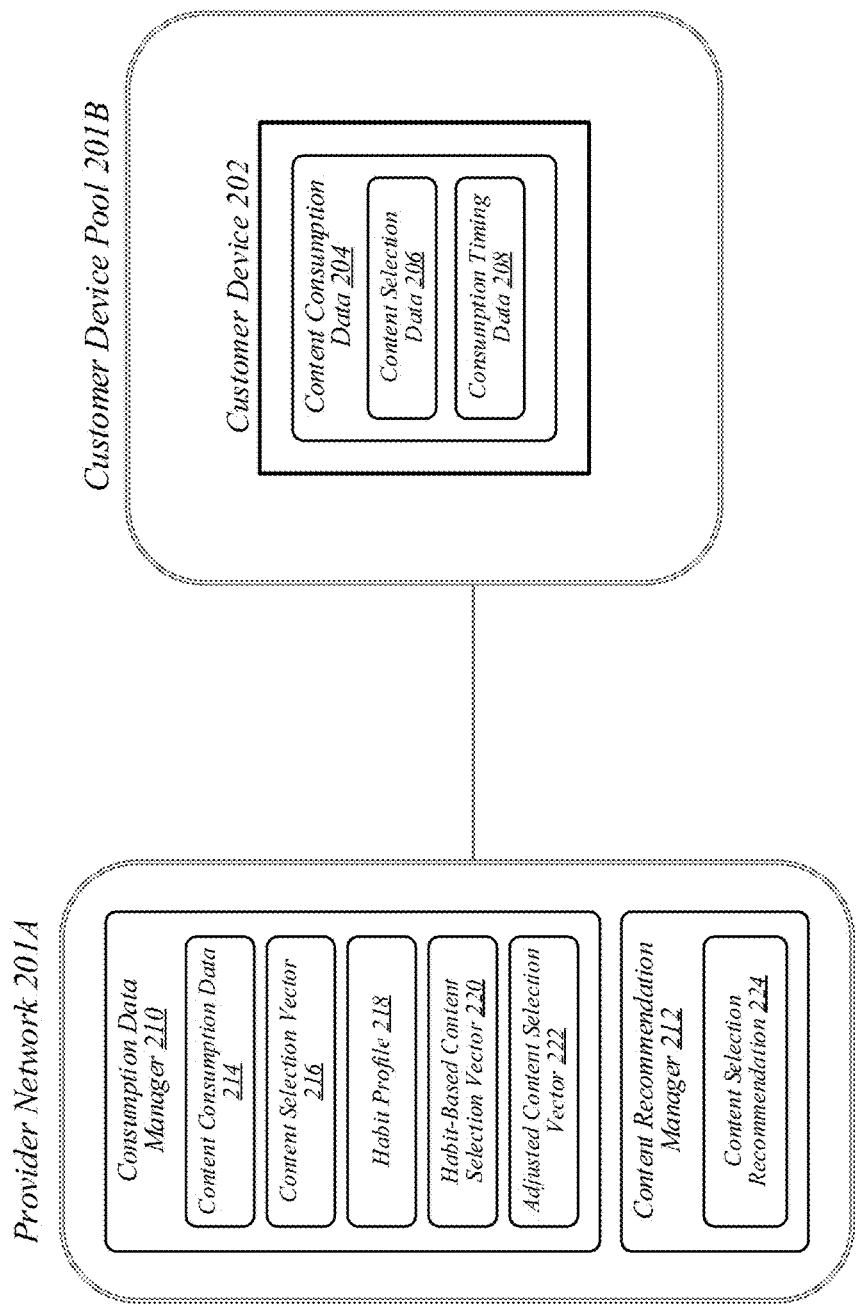
FIG. 2 is a block diagram illustrating an example, non-limiting embodiment of an operating environment in accordance with various aspects described herein.

FIG. 2 is a block diagram illustrating an example, non-limiting embodiment of an operating environment 200 in accordance with various aspects described herein. In operating environment 200, a provider network 201A of a media/content service provider communicates with customer devices of a customer device pool 201B in conjunction with provision of media/content access services to customers of the media/content service provider. According to various embodiments, provider network 201A can correspond to elements of communication network 125 of FIG. 1. According to some embodiments, customer devices in customer device pool 201B can correspond to display devices 144 of FIG. 1. The embodiments are not limited in this context.

As shown in FIG. 2, customer device pool 201B can include a customer device 202. Customer device 202 can generally comprise a device that a customer uses to receive and consume content provided via provider network 201A. In various embodiments, customer device 202 can be configured to provide content consumption data to provider network 201A on an ongoing basis. Such content consumption data can generally comprise information describing aspects of content consumption observed at customer device 202. In some embodiments, customer device 202 can be configured to periodically report content consumption data to provider network 201A. In various embodiments, customer device 202 can be additionally or alternatively be configured to report content consumption data to provider network 201A on an aperiodic basis, such as upon command or in response to detection of certain events or conditions. The embodiments are not limited in this context.

In operating environment 200, content consumption data that customer device 202 sends to provider network 201A can include content consumption data 204. Content consumption data 204 can generally comprise information describing aspects of content consumption observed at customer device 202 over a particular time interval. For example, in some embodiments, content consumption data 204 can comprise information describing aspects of content consumption observed at customer device 202 over a given month. The embodiments are not limited to this example.

As shown in FIG. 2, content consumption data 204 can include content selection data 206 and consumption timing data 208. Content selection data 206 can generally comprise information identifying various content items consumed at customer device 202 over the particular time interval that content consumption data 204 covers. In various embodiments, such content items can comprise programs aired on television channels received via provider network 201A. In some such embodiments, content selection data 206 can identify the respective channels on which such programs were aired. Consumption timing data 208 can generally comprise information describing the timing according to which the identified content items have been consumed over the particular time interval that content consumption data 204 covers. In various embodiments, consumption timing data 208 can identify the days and times of day of consumption of content items identified in content selection data 206. The embodiments are not limited in this context.

In operating environment 200, provider network 201A comprises a consumption data manager 210 and a content recommendation manager 212. Consumption data manager 210 can generally be responsible for storing and processing content consumption data provided by customer devices of customer device pool 201B, such as the content consumption data 204 provided by customer device 202. Content recommendation manager 212 can generally be responsible for generating recommendations identifying content of potential interest to customers associated with customer devices of customer device pool 201B.

During ongoing operation, consumption data manager 210 can collect content consumption data 214, which can include content consumption data provided by various customer devices of customer device pool 201B. In some embodiments, for each customer device that provides content consumption data, consumption data manager 210 can construct a respective content selection vector and habit profile. For example, consumption data manager 210 can construct a content selection vector 216 and habit profile 218 for customer device 202 based on content consumption data 204.

Content selection vector 216 can generally indicate whether various content items were consumed at customer device 202 during a time interval covered by content consumption data 204. In various embodiments, for each of a plurality of programs or other content items that aired during a given month or other time interval, content selection vector 216 can comprise a corresponding value indicating whether that program/content item was consumed at customer device 202. In some embodiments, content selection vector 216 can be a binary vector. In various embodiments, each element in content selection vector 216 can be associated with a respective show that aired during the covered time interval. In some embodiments, when an element in content selection vector 216 comprises one possible binary value (e.g., a value of 1), it can indicate that customer device 202 was used to watch a corresponding show at least once during the covered time interval. The embodiments are not limited in this context.

Habit profile 218 can generally describe the timing according to which content was consumed at customer device 202 during the time interval covered by content consumption data 204. Additionally, habit profile 218 can generally indicate the channels via which such consumed content was received, and the frequencies with which customer device 202 accessed those channels. In various embodiments, habit profile 218 can identify days and times during which content was consumed using customer device 202. In some embodiments, habit profile 218 can indicate respective "tune-in counts" for various channels accessed by customer device 202 during the relevant time interval, where each tune-in count represents a number of times customer device 202 was tuned to that channel. In various embodiments, habit profile 218 can comprise a vector whose dimensions capture the count of tune-ins for each channel and time/day. In some embodiments, habit profile 218 can comprise and/or reflect other information that may be indicative of consumption habits associated with customer device 202, such as information obtained from a user's online calendar, information obtained by monitoring a user's purchasing history, and the like. The embodiments are not limited in this context.

As reflected in FIG. 2, in some embodiments, consumption data manager 210 can determine a habit-based content selection vector 220 for customer device 202. Habit-based content selection vector 220 may generally represent predicted show watching propensities of a customer associated with customer device 202 if the customer were to blindly follow their habits without making any choices. More particularly, habit-based content selection vector 220 can indicate predictions—based solely on customer habits described by habit profile 218—of whether various content items would be consumed at customer device 202 during a time interval covered by content consumption data 204.

In various embodiments, for each of a plurality of programs or other content items that aired during a given month or other time interval, habit-based content selection vector 220 can comprise a corresponding value indicating a prediction of whether that program/content item would be consumed at customer device 202, based on the customer habits described by habit profile 218. In some embodiments, each element in habit-based content selection vector 220 can be associated with a respective show that aired during the covered time interval. In various embodiments, the value of a given element in habit-based content selection vector 220 can represent a prediction, based on the customer habits described by habit profile 218, of whether customer device 202 would be used to watch a corresponding show during the covered time interval. In some embodiments, habit-based content selection vector 220 can be a binary vector. In various embodiments, when an element in habit-based content selection vector 220 comprises one possible binary value (e.g., a value of 1), it can indicate a prediction that customer device 202 would be used to watch a corresponding show during the covered time interval. The embodiments are not limited in this context.

In some embodiments, consumption data manager 210 can determine habit-based content selection vector 220 using a machine learning algorithm, such as a neural network. In various embodiments, the machine learning algorithm can accept habit profiles as inputs, and can generate habit-based content selection vectors as outputs. In some such embodiments, consumption data manager 210 can designate habit profile 218 as input to the machine learning algorithm, which can generate habit-based content selection vector 220 as output. In various embodiments, the machine learning algorithm can be trained using respective content consumption data for each of a plurality of customer devices of customer device pool 201B. The embodiments are not limited in this context.

In various embodiments, consumption data manager 210 can adjust content selection vector 216 based on habit-based content selection vector 220 in order to filter out habitual consumption activity from consumption that reflects customer preferences with respect to content. In some embodiments, the manner in which consumption data manager 210 adjusts content selection vector 216 may be expressed in the form of Equation (1) as follows:

$$Y_f = Y - Y_p \qquad (1)$$

where Y corresponds to content selection vector 216, $Y_p$ corresponds to habit-based content selection vector 220, and $Y_f$ corresponds to adjusted content selection vector 222.

In some embodiments, content recommendation manager 212 can generate a content selection recommendation 224 for customer device 202 based on adjusted content selection vector 222. In various embodiments, content recommendation manager 212 may use adjusted content selection vector 222 as input to one or more recommender algorithms to identify content to be recommended for customer device 202. In some embodiments, using adjusted content selection vector 222 as input to such algorithms may yield better recommendations that are more reflective of actual customer tastes than those obtainable using content selection vector 216. Since customers can tend to frequent a limited number of channels, and/or consume content during particular times of day or days of the week, strong correlations can be observed between programs airing on the same channel and/or programs airing at same or similar times of day and/or days of the week. Such habit-based correlations, although not reflective of actual customer tastes, can overshadow taste-based correlations that may be reflected in the data. As such, recommendations generated using content selection vector 216 may largely advocate consumption of additional shows on channels that the customer tends to watch and/or shows that air in time slots during which the customer tends to consume content. In contrast, since habit-based correlations may largely be absent from adjusted content selection vector 222, recommendations generated using adjusted content selection vector 222 may be more likely to identify programs of interest to the customer. The embodiments are not limited in this context.

FIG. 3 depicts an illustrative embodiment of a content selection matrix 300 in accordance with various aspects described herein. Content selection matrix 300 generally describes content selection observed at each of N customer devices. Each row of content selection matrix 300 is labeled with a user identifier (uid) corresponding to a respective one of the N customer devices, and comprises a content selection vector associated with that device. For example, the first row of content selection matrix 300 is labeled "uid1" and comprises a content selection vector associated with a customer device corresponding to the user identifier "uid1". Each column of content selection matrix 300 is labeled with a program identifier (pid) corresponding to a respective one of P programs. For a given column of content selection matrix 300, the respective binary value in each of the N rows of the matrix indicates whether the customer device associated with that row consumed the program associated with that column. For example, the first column of content selection matrix 300 is labeled "pid1" and comprises, for each row, a respective binary value indicating whether the customer device associated with that row consumed the program corresponding to the program identifier "pid1". The embodiments are not limited to these examples.

Figure 4:
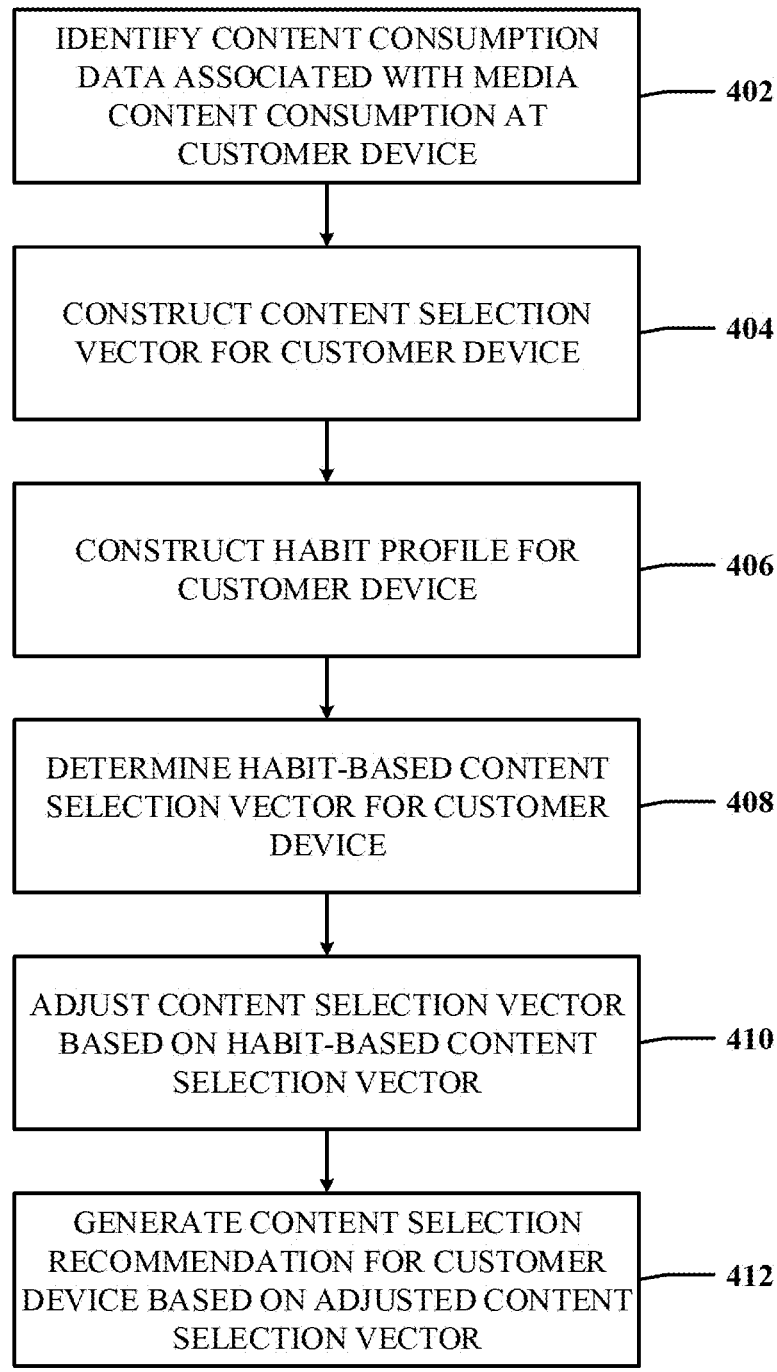
FIG. 4 depicts an illustrative embodiment of a method in accordance with various aspects described herein.

FIG. 4 depicts an illustrative embodiment of a method 400 in accordance with various aspects described herein. According to various embodiments, method 400 can be representative of operations performed by equipment of provider network 201A in operating environment 200 of FIG. 2. As shown in FIG. 4, content consumption data may be identified at 402 that is associated with media content consumption at a customer device. For example, in operating environment 200 of FIG. 2, consumption data manager 210 may identify content consumption data 204, which may be among content consumption data 214 collected by consumption data manager 210. At 404, a content selection vector may be constructed for the customer device based on the content consumption data identified at 402. For example, in operating environment 200 of FIG. 2, consumption data manager 210 may construct content selection vector 216 for customer device 202 based on content consumption data 204.

At 406, a habit profile may be constructed for the customer device based on the content consumption data identified at 402. For example, in operating environment 200 of FIG. 2, consumption data manager 210 may construct habit profile 218 for customer device 202 based on content consumption data 204. At 408, a habit-based content selection vector may be determined for the customer device. For example, in operating environment 200 of FIG. 2, consumption data manager 210 may determine habit-based content selection vector 220 for customer device 202. In some embodiments, the habit-based content selection vector may be determined at 408 based on the habit profile constructed at 406. In various embodiments, a machine learning algorithm, such as a neural network, may be used to generate the habit-based content selection vector based on the habit profile. For example, in operating environment 200 of FIG. 2, consumption data manager 210 may use a neural network or other machine learning algorithm to generate habit-based content selection vector 220 based on habit profile 218.

At 410, the content selection vector constructed at 404 may be adjusted based on the habit-based content selection vector determined at 408. For example, in operating environment 200 of FIG. 2, consumption data manager 210 may adjust content selection vector 216 based on habit-based content selection vector 220, thereby obtaining adjusted content selection vector 222. At 412, a content selection recommendation for the customer device may be generated based on the adjusted content selection vector obtained at 410. For example, in operating environment 200 of FIG. 2, content recommendation manager 212 may generate content selection recommendation 224 based on adjusted content selection vector 222. The embodiments are not limited to these examples.

While for purposes of simplicity of explanation, the respective processes are shown and described as a series of blocks in FIG. 4, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

It is worthy of note that although the preceding discussion is generally directed to embodiments in which habit profile construction and content selection recommendation generation are performed on a per-customer device basis, based on content consumption data aggregated at the device level, the embodiments are not so limited. In some embodiments, for example, content consumption data may be aggregated the level of an account, household, or family, and content selection recommendations may be generated on a per-account, per-household, or per-family basis. In some other embodiments, content consumption data may be aggregated on a per-access card basis. In such embodiments, for a given time interval, the content consumption data to be aggregated for a given access card may be data describing content consumption at a customer device that housed that access card during the given time interval. In the case that an access card is removed from a first device and installed in a second device during a given time interval, then the aggregated content consumption data for that time interval may include both content consumption data describing consumption at the first device and content consumption data describing consumption at the second device. The embodiments are not limited in this context.

Figure 5:
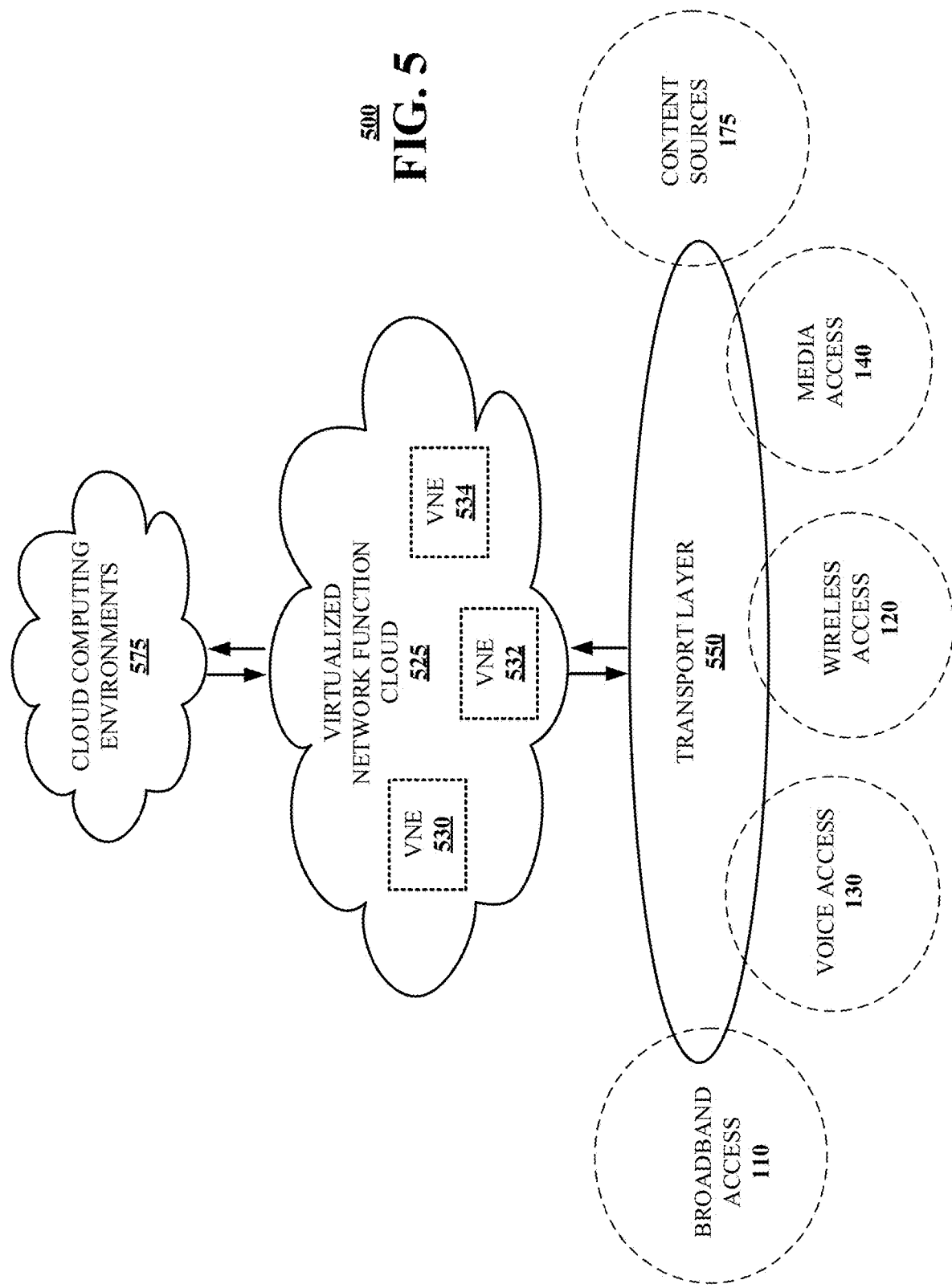
FIG. 5 is a block diagram illustrating an example, non-limiting embodiment of a virtualized communication network in accordance with various aspects described herein.

Referring now to FIG. 5, a block diagram 500 is shown illustrating an example, non-limiting embodiment of a virtualized communication network in accordance with various aspects described herein. In particular a virtualized communication network is presented that can be used to implement some or all of the subsystems and functions of system 100, the subsystems and functions of consumption data manager 210, content recommendation manager 212, and method 400 presented in FIGS. 1, 2, and 4. For example, virtualized communication network 500 can facilitate in whole or in part, identifying content consumption data associated with media content consumption at a customer device, constructing a content selection vector and habit profile for the customer device based on the content consumption data, determining a habit-based content selection vector for the customer device, adjusting the content selection vector based on the habit-based content selection vector, and generating a content selection recommendation for the customer device based on the adjusted content selection vector.

In particular, a cloud networking architecture is shown that leverages cloud technologies and supports rapid innovation and scalability via a transport layer 550, a virtualized network function cloud 525 and/or one or more cloud computing environments 575. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 530, 532, 534, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 530 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 550 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 530, 532 or 534. These network elements can be included in transport layer 550.

The virtualized network function cloud 525 interfaces with the transport layer 550 to provide the VNEs 530, 532, 534, etc. to provide specific NFVs. In particular, the virtualized network function cloud 525 leverages cloud operations, applications, and architectures to support networking workloads. The virtualized network elements 530, 532 and 534 can employ network function software that provides either a one-for-one mapping of traditional network element function or alternately some combination of network functions designed for cloud computing. For example, VNEs 530, 532 and 534 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 530, 532, 534, etc. can be instantiated and managed using an orchestration approach similar to those used in cloud compute services.

The cloud computing environments 575 can interface with the virtualized network function cloud 525 via APIs that expose functional capabilities of the VNEs 530, 532, 534, etc. to provide the flexible and expanded capabilities to the virtualized network function cloud 525. In particular, network workloads may have applications distributed across the virtualized network function cloud 525 and cloud computing environment 575 and in the commercial cloud, or might simply orchestrate workloads supported entirely in NFV infrastructure from these third party locations.

Figure 6:
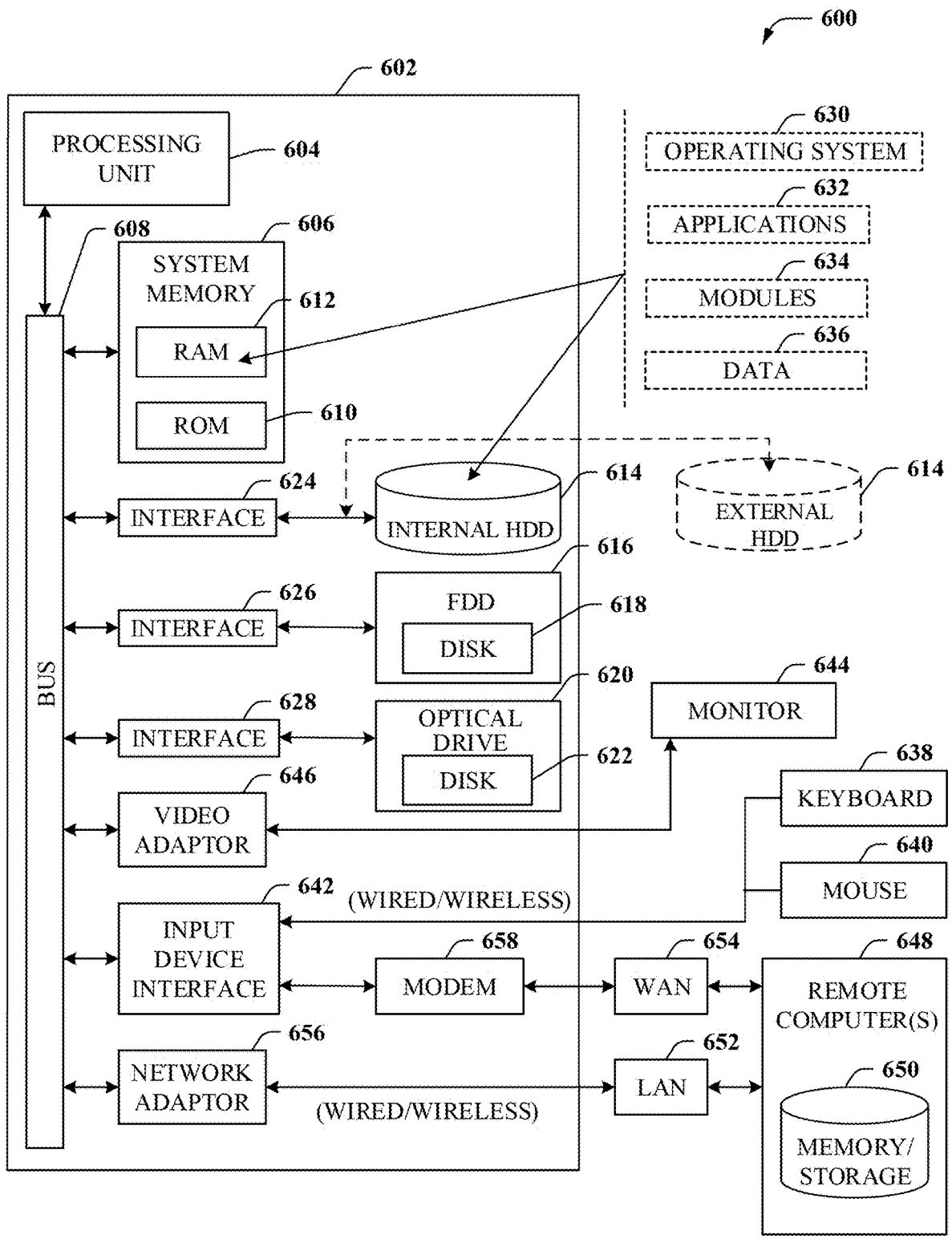
FIG. 6 is a block diagram of an example, non-limiting embodiment of a computing environment in accordance with various aspects described herein.

Turning now to FIG. 6, there is illustrated a block diagram of a computing environment in accordance with various aspects described herein. In order to provide additional context for various embodiments of the embodiments described herein, FIG. 6 and the following discussion are intended to provide a brief, general description of a suitable computing environment 600 in which the various embodiments of the subject disclosure can be implemented. In particular, computing environment 600 can be used in the implementation of network elements 150, 152, 154, 156, access terminal 112, base station or access point 122, switching device 132, media terminal 142, and/or VNEs 530, 532, 534, etc. Each of these devices can be implemented via computer-executable instructions that can run on one or more computers, and/or in combination with other program modules and/or as a combination of hardware and software. For example, computing environment 600 can facilitate in whole or in part, identifying content consumption data associated with media content consumption at a customer device, constructing a content selection vector and habit profile for the customer device based on the content consumption data, determining a habit-based content selection vector for the customer device, adjusting the content selection vector based on the habit-based content selection vector, and generating a content selection recommendation for the customer device based on the adjusted content selection vector.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 6, the example environment can comprise a computer 602, the computer 602 comprising a processing unit 604, a system memory 606 and a system bus 608. The system bus 608 couples system components including, but not limited to, the system memory 606 to the processing unit 604. The processing unit 604 can be any of various commercially available processors. Dual microprocessors and other multiprocessor architectures can also be employed as the processing unit 604.

The system bus 608 can be any of several types of bus structure that can further interconnect to a memory bus (with or without a memory controller), a peripheral bus, and a local bus using any of a variety of commercially available bus architectures. The system memory 606 comprises ROM 610 and RAM 612. A basic input/output system (BIOS) can be stored in a non-volatile memory such as ROM, erasable programmable read only memory (EPROM), EEPROM, which BIOS contains the basic routines that help to transfer information between elements within the computer 602, such as during startup. The RAM 612 can also comprise a high-speed RAM such as static RAM for caching data.

The computer 602 further comprises an internal hard disk drive (HDD) 614 (e.g., EIDE, SATA), which internal HDD 614 can also be configured for external use in a suitable chassis (not shown), a magnetic floppy disk drive (FDD) 616, (e.g., to read from or write to a removable diskette 618) and an optical disk drive 620, (e.g., reading a CD-ROM disk 622 or, to read from or write to other high capacity optical media such as the DVD). The HDD 614, magnetic FDD 616 and optical disk drive 620 can be connected to the system bus 608 by a hard disk drive interface 624, a magnetic disk drive interface 626 and an optical drive interface 628, respectively. The hard disk drive interface 624 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 602, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 612, comprising an operating system 630, one or more application programs 632, other program modules 634 and program data 636. All or portions of the operating system, applications, modules, and/or data can also be cached in the RAM 612. The systems and methods described herein can be implemented utilizing various commercially available operating systems or combinations of operating systems.

A user can enter commands and information into the computer 602 through one or more wired/wireless input devices, e.g., a keyboard 638 and a pointing device, such as a mouse 640. Other input devices (not shown) can comprise a microphone, an infrared (IR) remote control, a joystick, a game pad, a stylus pen, touch screen or the like. These and other input devices are often connected to the processing unit 604 through an input device interface 642 that can be coupled to the system bus 608, but can be connected by other interfaces, such as a parallel port, an IEEE 1394 serial port, a game port, a universal serial bus (USB) port, an IR interface, etc.

A monitor 644 or other type of display device can be also connected to the system bus 608 via an interface, such as a video adapter 646. It will also be appreciated that in alternative embodiments, a monitor 644 can also be any display device (e.g., another computer having a display, a smart phone, a tablet computer, etc.) for receiving display information associated with computer 602 via any communication means, including via the Internet and cloud-based networks. In addition to the monitor 644, a computer typically comprises other peripheral output devices (not shown), such as speakers, printers, etc.

The computer 602 can operate in a networked environment using logical connections via wired and/or wireless communications to one or more remote computers, such as a remote computer(s) 648. The remote computer(s) 648 can be a workstation, a server computer, a router, a personal computer, portable computer, microprocessor-based entertainment appliance, a peer device or other common network node, and typically comprises many or all of the elements described relative to the computer 602, although, for purposes of brevity, only a remote memory/storage device 650 is illustrated. The logical connections depicted comprise wired/wireless connectivity to a local area network (LAN) 652 and/or larger networks, e.g., a wide area network (WAN) 654. Such LAN and WAN networking environments are commonplace in offices and companies, and facilitate enterprise-wide computer networks, such as intranets, all of which can connect to a global communications network, e.g., the Internet.

When used in a LAN networking environment, the computer 602 can be connected to the LAN 652 through a wired and/or wireless communication network interface or adapter 656. The adapter 656 can facilitate wired or wireless communication to the LAN 652, which can also comprise a wireless AP disposed thereon for communicating with the adapter 656.

When used in a WAN networking environment, the computer 602 can comprise a modem 658 or can be connected to a communications server on the WAN 654 or has other means for establishing communications over the WAN 654, such as by way of the Internet. The modem 658, which can be internal or external and a wired or wireless device, can be connected to the system bus 608 via the input device interface 642. In a networked environment, program modules depicted relative to the computer 602 or portions thereof, can be stored in the remote memory/storage device 650. It will be appreciated that the network connections shown are example and other means of establishing a communications link between the computers can be used.

The computer 602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 7:
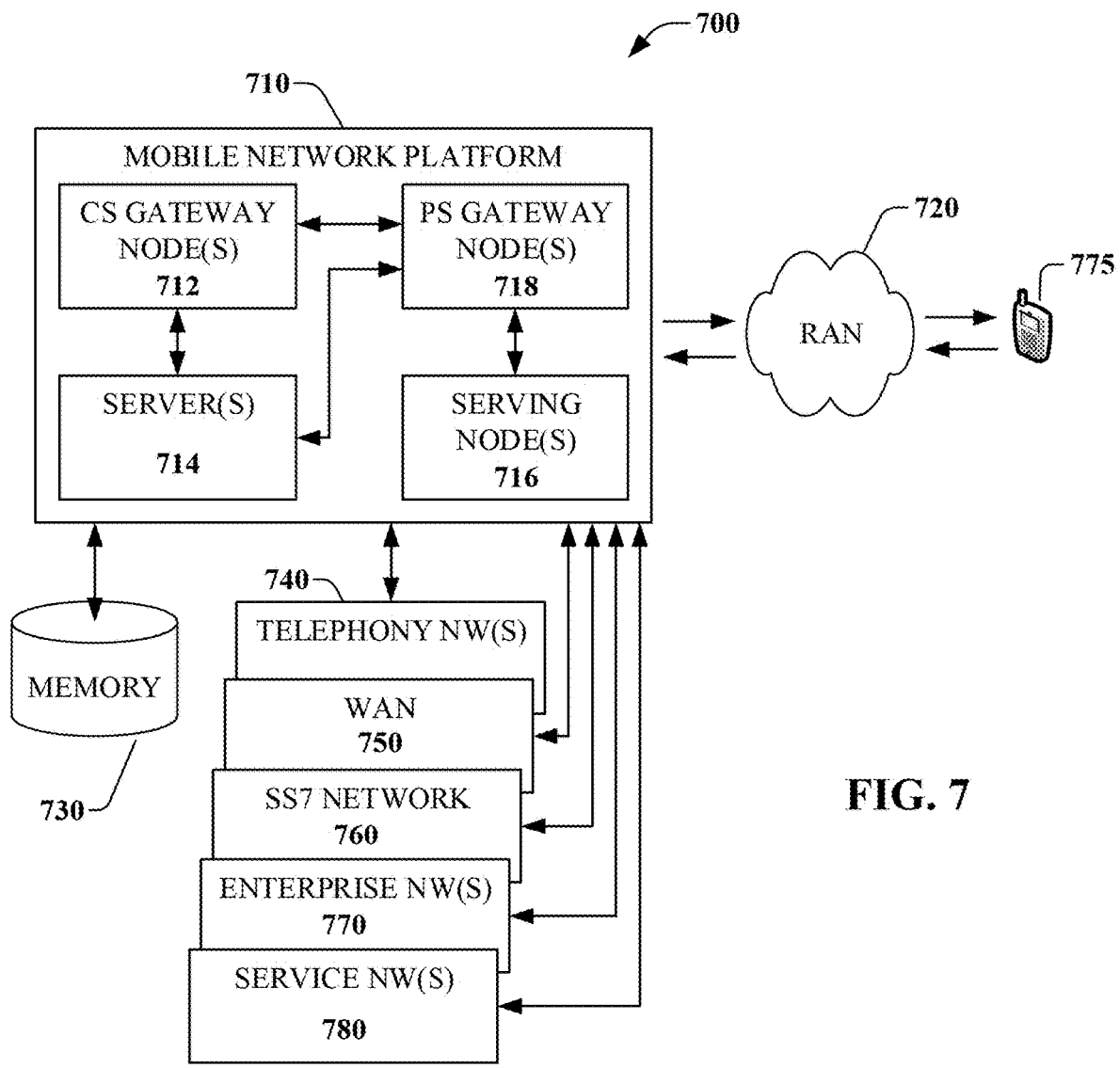
FIG. 7 is a block diagram of an example, non-limiting embodiment of a mobile network platform in accordance with various aspects described herein.

Turning now to FIG. 7, an embodiment 700 of a mobile network platform 710 is shown that is an example of network elements 150, 152, 154, 156, and/or VNEs 530, 532, 534, etc. For example, platform 710 can facilitate in whole or in part, identifying content consumption data associated with media content consumption at a customer device, constructing a content selection vector and habit profile for the customer device based on the content consumption data, determining a habit-based content selection vector for the customer device, adjusting the content selection vector based on the habit-based content selection vector, and generating a content selection recommendation for the customer device based on the adjusted content selection vector.

In one or more embodiments, the mobile network platform 710 can generate and receive signals transmitted and received by base stations or access points such as base station or access point 122. Generally, mobile network platform 710 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 710 can be included in telecommunications carrier networks, and can be considered carrier-side components as discussed elsewhere herein. Mobile network platform 710 comprises CS gateway node(s) 712 which can interface CS traffic received from legacy networks like telephony network(s) 740 (e.g., public switched telephone network (PSTN), or public land mobile network (PLMN)) or a signaling system #7 (SS7) network 760. CS gateway node(s) 712 can authorize and authenticate traffic (e.g., voice) arising from such networks. Additionally, CS gateway node(s) 712 can access mobility, or roaming, data generated through SS7 network 760; for instance, mobility data stored in a visited location register (VLR), which can reside in memory 730. Moreover, CS gateway node(s) 712 interfaces CS-based traffic and signaling and PS gateway node(s) 718. As an example, in a 3GPP UMTS network, CS gateway node(s) 712 can be realized at least in part in gateway GPRS support node(s) (GGSN). It should be appreciated that functionality and specific operation of CS gateway node(s) 712, PS gateway node(s) 718, and serving node(s) 716, is provided and dictated by radio technology(ies) utilized by mobile network platform 710 for telecommunication over a radio access network 720 with other devices, such as a radiotelephone 775.

In addition to receiving and processing CS-switched traffic and signaling, PS gateway node(s) 718 can authorize and authenticate PS-based data sessions with served mobile devices. Data sessions can comprise traffic, or content(s), exchanged with networks external to the mobile network platform 710, like wide area network(s) (WANs) 750, enterprise network(s) 770, and service network(s) 780, which can be embodied in local area network(s) (LANs), can also be interfaced with mobile network platform 710 through PS gateway node(s) 718. It is to be noted that WANs 750 and enterprise network(s) 770 can embody, at least in part, a service network(s) like IP multimedia subsystem (IMS). Based on radio technology layer(s) available in technology resource(s) or radio access network 720, PS gateway node(s) 718 can generate packet data protocol contexts when a data session is established; other data structures that facilitate routing of packetized data also can be generated. To that end, in an aspect, PS gateway node(s) 718 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 700, mobile network platform 710 also comprises serving node(s) 716 that, based upon available radio technology layer(s) within technology resource(s) in the radio access network 720, convey the various packetized flows of data streams received through PS gateway node(s) 718. It is to be noted that for technology resource(s) that rely primarily on CS communication, server node(s) can deliver traffic without reliance on PS gateway node(s) 718; for example, server node(s) can embody at least in part a mobile switching center. As an example, in a 3GPP UMTS network, serving node(s) 716 can be embodied in serving GPRS support node(s) (SGSN).

For radio technologies that exploit packetized communication, server(s) 714 in mobile network platform 710 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 710. Data streams (e.g., content(s) that are part of a voice call or data session) can be conveyed to PS gateway node(s) 718 for authorization/authentication and initiation of a data session, and to serving node(s) 716 for communication thereafter. In addition to application server, server(s) 714 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 710 to ensure network's operation and data integrity in addition to authorization and authentication procedures that CS gateway node(s) 712 and PS gateway node(s) 718 can enact. Moreover, provisioning server(s) can provision services from external network(s) like networks operated by a disparate service provider; for instance, WAN 750 or Global Positioning System (GPS) network(s) (not shown). Provisioning server(s) can also provision coverage through networks associated to mobile network platform 710 (e.g., deployed and operated by the same service provider), such as the distributed antennas networks shown in FIG. 1(s) that enhance wireless service coverage by providing more network coverage.

It is to be noted that server(s) 714 can comprise one or more processors configured to confer at least in part the functionality of mobile network platform 710. To that end, the one or more processor can execute code instructions stored in memory 730, for example. It is should be appreciated that server(s) 714 can comprise a content manager, which operates in substantially the same manner as described hereinbefore.

In example embodiment 700, memory 730 can store information related to operation of mobile network platform 710. Other operational information can comprise provisioning information of mobile devices served through mobile network platform 710, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 730 can also store information from at least one of telephony network(s) 740, WAN 750, SS7 network 760, or enterprise network(s) 770. In an aspect, memory 730 can be, for example, accessed as part of a data store component or as a remotely connected memory store.

In order to provide a context for the various aspects of the disclosed subject matter, FIG. 7, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 8:
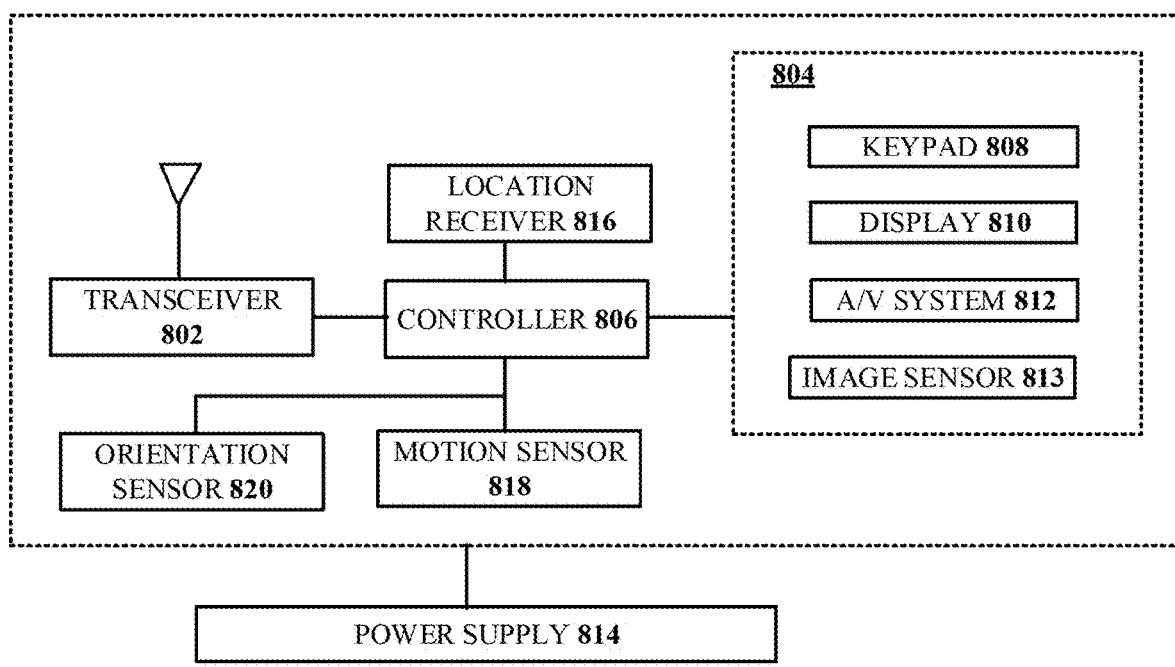
FIG. 8 is a block diagram of an example, non-limiting embodiment of a communication device in accordance with various aspects described herein.

Turning now to FIG. 8, an illustrative embodiment of a communication device 800 is shown. The communication device 800 can serve as an illustrative embodiment of devices such as data terminals 114, mobile devices 124, vehicle 126, display devices 144 or other client devices for communication via either communications network 125. For example, computing device 800 can facilitate in whole or in part, identifying content consumption data associated with media content consumption at a customer device, constructing a content selection vector and habit profile for the customer device based on the content consumption data, determining a habit-based content selection vector for the customer device, adjusting the content selection vector based on the habit-based content selection vector, and generating a content selection recommendation for the customer device based on the adjusted content selection vector.

The communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface having graphical user interface (GUI) elements that can be selected by a user with a touch of a finger. The display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable communications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. An apparatus, comprising:
a processing system including a processor; and
a memory that stores executable instructions that, when executed by the processing system, facilitate performance of operations, the operations comprising:
identifying a content selection vector from content consumption data for a customer device, wherein the content consumption data is associated with media content consumption at the customer device;
constructing a habit profile for the customer device based on the content consumption data;
determining a habit-based content selection vector for the customer device wherein the habit-based content selection vector identifies media content consumption in a habitual, regular fashion for the customer device;
adjusting the content selection vector for the customer device based on removing content identified by the habit-based content selection vector, resulting in an adjusted content selection vector for the customer device; and
generating a content selection recommendation for the customer device based on the adjusted content selection vector.

2. The apparatus of claim 1, wherein the operations further comprise constructing the content selection vector based on the content consumption data.

3. The apparatus of claim 1, wherein the operations further comprise generating the habit-based content selection vector based on the habit profile, using a machine learning algorithm.

4. The apparatus of claim 3, wherein the machine learning algorithm comprises a neural network.

5. The apparatus of claim 3, wherein the operations further comprise training the machine learning algorithm using respective content consumption data for each of a plurality of customer devices served by a content service provider network.

6. The apparatus of claim 1, wherein the content consumption data is associated with a specific time interval.

7. The apparatus of claim 1, wherein the habit profile indicates one or more times of day during which content has been consumed at the customer device.

8. The apparatus of claim 1, wherein the habit profile indicates one or more weekdays upon which content has been consumed at the customer device.

9. The apparatus of claim 1, wherein the habit profile indicates one or more weekend days upon which content has been consumed at the customer device.

10. The apparatus of claim 1, wherein the habit profile indicates one or more channels via which the customer device has received content consumed at the customer device.

11. The apparatus of claim 10, wherein the habit profile indicates, for each channel of the one or more channels, a respective tune-in count.

12. The apparatus of claim 1, wherein the customer device comprises a set-top box or a mobile communication device.

13. A non-transitory machine-readable medium, comprising executable instructions that, when executed by a processing system including a processor, facilitate performance of operations, the operations comprising:
constructing a content selection vector and a habit profile for a customer device based on content consumption data for the customer device, wherein the content consumption data is associated with media content consumption at the customer device;
determining a habit-based content selection vector for the customer device based on the habit profile, wherein the habit-based content selection vector identifies media content consumption in a habitual, regular fashion for the customer device;
adjusting the content selection vector for the customer device based on removing content identified by the habit-based content selection vector, resulting in an adjusted content selection vector for the customer device; and
generating a content selection recommendation for the customer device based on the adjusted content selection vector.

14. The non-transitory machine-readable medium of claim 13, wherein the operations further comprise constructing the content selection vector based on the content consumption data.

15. The non-transitory machine-readable medium of claim 13, wherein the operations further comprise using a machine learning algorithm to generate the habit-based content selection vector based on the habit profile.

16. The non-transitory machine-readable medium of claim 15, wherein the operations further comprise training the machine learning algorithm using respective content consumption data for each of a plurality of customer devices served by a content service provider network.

17. The non-transitory machine-readable medium of claim 13, wherein the habit profile indicates one or more channels via which the customer device has received content consumed at the customer device and, for each channel of the one or more channels, a respective tune-in count.

18. A method, comprising:
identifying, by a processing system comprising a processor, content consumption data for a customer device, wherein the content consumption data is associated with media content consumption at the customer device;
constructing, based on the content consumption data:
a habit profile for the customer device; and
a content selection vector for the customer device;
determining, by the processing system, a habit-based content selection vector for the customer device based on the habit profile, wherein the habit-based content selection vector identifies media content consumption in a habitual, regular fashion for the customer device;
adjusting, by the processing system, the content selection vector based on removing content identified by the habit-based content selection vector, resulting in an adjusted content selection vector for the customer device; and
generating, by the processing system, a content selection recommendation for the customer device based on the adjusted content selection vector.

19. The method of claim 18, further comprising using a machine learning algorithm to generate the habit-based content selection vector based on the habit profile.

20. The method of claim 18, wherein the habit profile indicates one or more channels via which the customer device has received content consumed at the customer device and, for each channel of the one or more channels, a respective tune-in count.

* * * * *